COUNTING APPARATUS

Original Filed May 16, 1961 2 Sheets-Sheet 1

Jan. 11, 1966 A. P. JACKEL 3,229,168

COUNTING APPARATUS

Original Filed May 16, 1961 2 Sheets-Sheet 2

3,229,168
COUNTING APPARATUS

Arthur Paul Jackel, Penn Hills Township, Allegheny County, Pa., assignor to Westinghouse Air Brake Company, Swissvale, Pa., a corporation of Pennsylvania
Original application May 16, 1961, Ser. No. 110,553, now Patent No. 3,130,867, dated Apr. 28, 1964. Divided and this application Dec. 19, 1963, Ser. No. 331,760
9 Claims. (Cl. 317—140)

This invention pertains to counting apparatus. More specifically, my invention pertains to counting apparatus by which periodic pulses may be counted in decimal binary code form representing a decimal number having two or more digits.

This present application is a division of my copending application for Letters Patent of the United States Serial No. 110,553, filed May 16, 1961, for a Pipeline Metering and Product Delivery Control System, now Patent 3,130,867, issued April 28, 1964.

There are many occasions in which the count of selected periodic actions is required. These periodic actions may occur as the closing of a contact, each contact closure representing a unit of measure of the quantity of a product flowing in a pipeline, as in the original application. In other instances, the periodic actions may be the reception of individual input pulses occurring periodically and received from an external source. If the registered count is to be transmitted by some type of remote indication system to a central location for further recording and use, the count must be in a form which is easily and readily transmitted by the system in service. One count form which is easily adapted to transmission by many remote indication systems is the binary number or binary code form. This is especially true when the control or indication system is of the well known time code type frequently used in remote control installations. Further, in order to reduce the number of bits of information to be transmitted, the binary code is best recorded as a decimal binary code, which limits the number of code bits to be transmitted to four for each decimal number digit to be indicated. Obviously, this is of especial advantage if a relatively large total count is normally recorded at each location.

Accordingly, it is an object of my present invention to provide counting apparatus which will record or register periodic actions in a binary code form.

Another object of my invention is a counting arrangement which will register, in decimal binary code form, a decimal count which occurs one unit at a time.

It is also an object of my invention to provide counting apparatus which will register a repeated unit count in multi-digit decimal binary code form.

Still another object of my invention is decimal binary code counting apparatus for registering, in multi-digit form, the repeated closings of a contact representing units of measure of a product.

Other objects, features, and advantages of my invention will become apparent from the following description when taken in connection with the accompanying drawings.

In describing my invention, first in general terms and then in specific detail, reference will be made from time to time to the accompanying drawings in which.

In each of the drawings, similar reference characters refer to similiar parts of the apparatus. Also, the same reference characters are used as in the original application in order to simplify cross reference.

In practicing my invention, I provide a bank of four counting relays for each digit of the decimal number that is to be counted. Each such bank or section of the chain records the corresponding decimal digit in decimal binary code form. Thus, at a particular instant, the existing position or condition of the relays in each bank, when properly weighted, represents the number corresponding to that decimal digit in the total count. This counting chain is driven by a contact which closes to represent each input pulse of the total count. In actual installations, as illustrated in the parent application, the closing of this contact may represent each unit of measure of the product whose quantity of flow is being recorded. The successive closures of this contact basically drive that portion of the entire chain which records the units digit of the decimal number. Two additional or stepping relays are also associated with each portion or bank of the chain, that is, each digit section, to control the binary counting action. Each pair of stepping relays is actuated through a preselected binary pattern by the driving contact, in accordance with the advancing count in the associated counting relays. One or both of the stepping relays, following the preset pattern, thus pick up at the termination of each odd numbered counting pulse and release at the termination of the immediately following even numbered pulse. When the units digit section records in binary form a count of nine, the subsequent count is entered into the next digit section or portion of the chain, i.e., the tens digit section. When this occurs, the unit section is reset to its zero position and repeats its counting cycle. A similar action occurs between each pair of adjacent sections or banks as a nine count is recorded in the lower order digit section. Such counting action, of course, is continuous as long as the contact continues to indicate or mark the reception of the individual counts.

Figure 1:
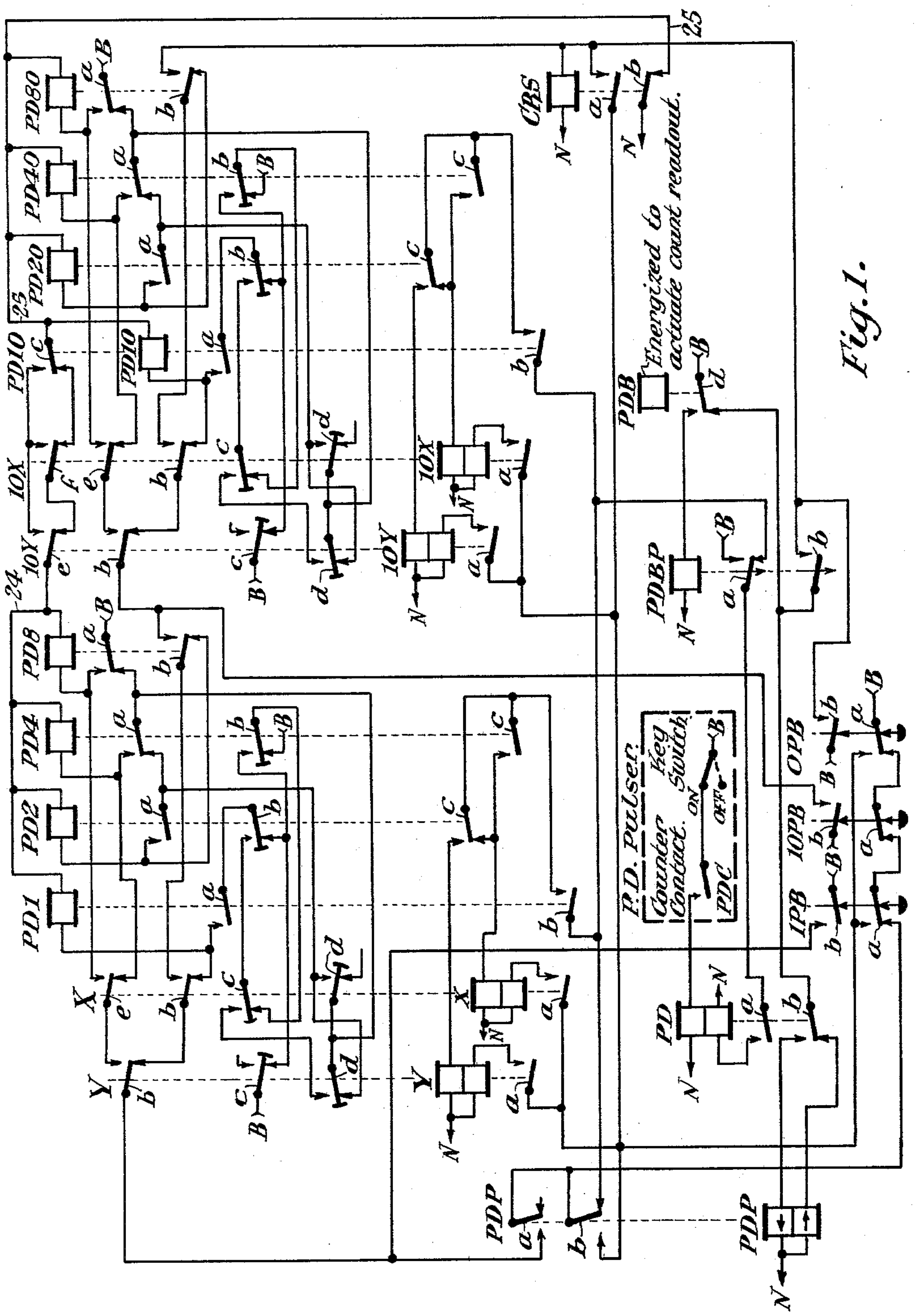
FIG. 1 illustrates, in diagrammatic circuit form, counting apparatus embodying my invention in the form of a decimal binary code counting chain.
Figure 2:
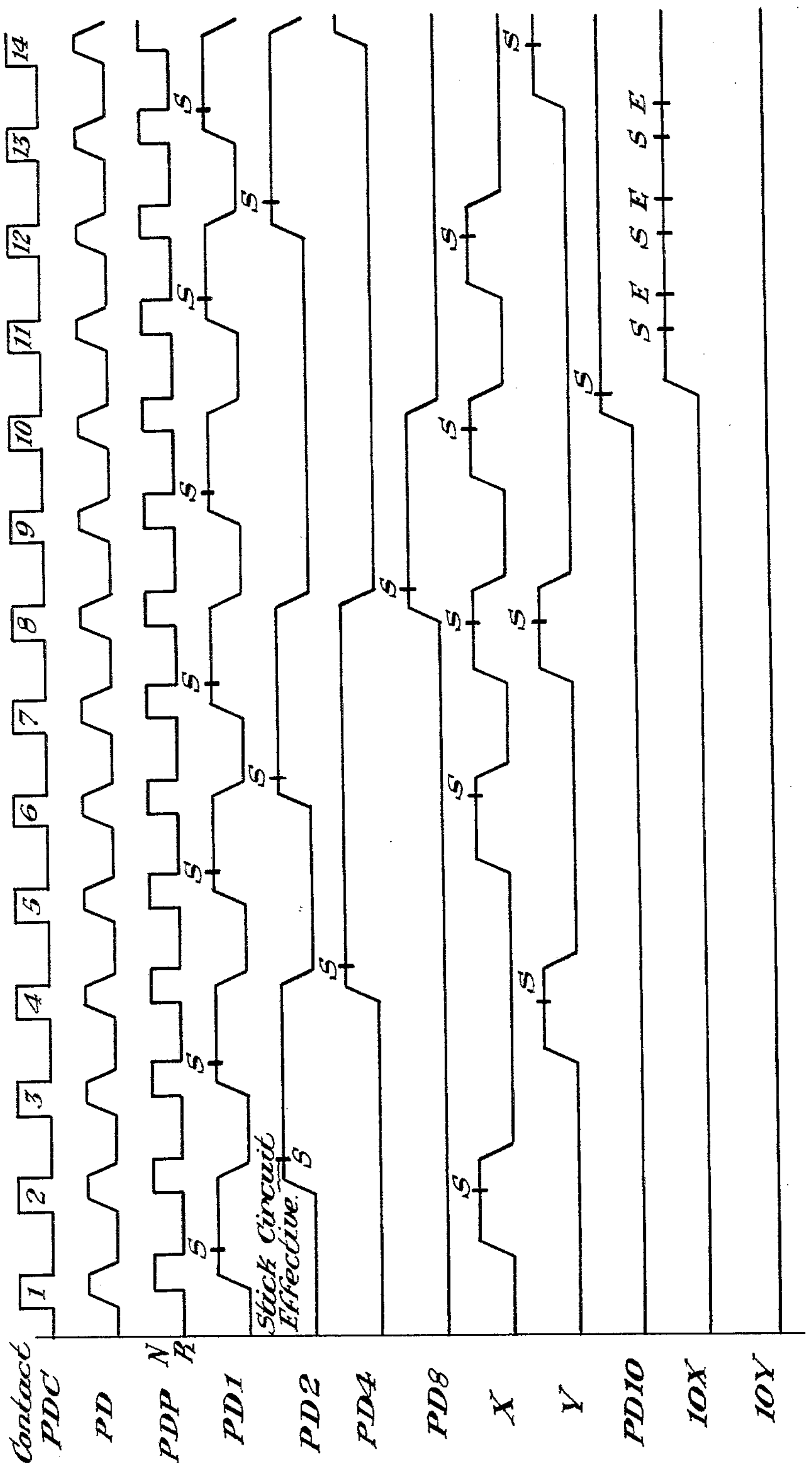
FIG. 2 is a conventional time chart illustrating the relay operations during the counting action by the chain disclosed in FIG. 1.

I shall now describe in more specific detail a circuit arrangement embodying one form of my invention and the operation of this arrangement, referring to the specific circuits shown diagrammatically in FIG. 1 and the conventional time chart of FIG. 2. Following this specific description, I shall point out the novelty of the arrangement of my invention in the appended claims.

In referring to the drawings, it is to be noted that conventional symbols have been used throughout. Contacts of each relay are shown in vertical alignment with the conventional symbol for the relay winding. The individual contact sets, however, may be shown above or below the winding symbol. In either case, the movable portion, that is, the armature, by convention moves upward when the relay is energized and closes against the front contacts in the upper position. When the relay is deenergized and releases, the armatures move to their lower positions where they close back contacts. Some of the relay contact sets are of the type known as continuity transfer contacts and are so designated in the drawing by the short arc appended to the end of the movable armature of that transfer contact. In the operation of such contacts, as is well known, a front contact circuit is made before the circuit over the corresponding back contact is broken. For the circuit arrangement shown in FIG. 1, a local source of direct current energy is provided for energizing the various relays. Since the use of such direct current sources is conventional and well known, and further since any one of several known types may be used, the particular source here used is not shown in detail. However, connections to its positive and negative terminals are indicated by the reference characters B and N, respectively. Other special symbols or apparatus used in the circuit drawing will be described as necessary during the following specific description.

The counting arrangement embodied in this form of my invention is, as previously mentioned, divided into various digit sections or banks, each section representing or counting the corresponding digit in the total decimal number count. In the specific arrangement of FIG. 1, only the units and tens digit sections are shown. When a larger number must be counted, other sections are added to the chain as required. Each bank or section of the counter consists of four counting relays designated by the general reference character PD and two stepping relays X and Y. In the two sections shown, the stepping relays for the tens digit section of the counter are designated by the reference characters 10X and 10Y while the relays for the units portion are merely designated relays X and Y. Each suffix added to the general reference character PD to distinguish the various counting relays represents the equivalent count weight which that relay adds to the code arrangement in the decimal binary code here used. Said in another way, when the binary number represented by the energization condition of the four counting relays in a section is to be translated into a decimal number, each energized relay is weighted in accordance with the numerical suffix in its reference character to accomplish the translation process.

The counting arrangement is driven by the contact shown within the dotted rectangle in the lower left portion of FIG. 1, the rectangle being designated as the PD pulser. This rectangle, as a background assumption, may represent a positive displacement meter which measures the product flow in a pipeline, as in the original application. Counter contact PDC within this pulsing arrangement is then driven by the meter to periodically close as each unit of measure of the product passes the meter location. In other words, each closing of contact PDC repreesnts a single unit of the total count to be recorded in the counting chain. However, in other cases, the chain may be driven by periodic input pulses received from an external source and such operation is included as part of the disclosure system. The key switch shown within the dotted rectangle is used to halt the driving of the counting arrangement by contact PDC in the event that it is desired to actuate the counting chain by manual operation of the local pushbuttons shown immediately below the pulser. One spring return pushbutton (1PB, 10PB) is provided for each section of the counting chain and one (ϕPB) for reset action. They are intended to be operated manually with each operation entering a single count into the corresponding section of the chain. It is belived that this manner of operation and control will become apparent from the description of the counting chain given in connection with its usual operation.

Each closure of contact PDC energizes the positive displacement relay PD by completing the circuit through the upper winding of this relay. Relay PD is provided with a repeater relay PDP which is of the magnetic stick type having two windings. This type of relay has the characteristic that, when either or both of its windings is energized by current flowing in the direction of the arrow shown within the winding symbol, the relay contacts are operated to close in the left hand or normal position. If the flow of current through either or both windings is in the direction opposite to the arrows shown therein, the relay contacts are operated to close in their right hand or reverse position. When the relay is deenergized, its contacts remain in the position to which they were last operated. Relay PDP is provided with two operating circuits. The first circuit, through its upper winding, further includes front contact *b* of relay PD and back contact *d* of a bus relay PDB. It is obvious that the flow of current in this circuit is in the direction of the arrow in the upper winding, thus the contacts of relay PDP will close in their normal position. The other circuit, through the lower winding of relay PDP, includes back contact *b* of relay PD and back contact *d* of relay PDB. The flow of current in this circuit is in the direction opposite to the arrow in the lower winding and thus the contacts of relay PDP will be operated to close in their reverse position when this circuit is effective. It is obvious that relay PDP alternately operates its contacts between the normal and reverse positions as relay PD is energized and deenergized, respectively, by the operation of contact PDC. It is to be noted that counts may also be entered by pulses for an external source supplied alternately to the two windings of relay PDP. In such case, each single count will consist of a pair of such alternate pulses, the count beginning with the pulse through the upper winding and terminating with the subsequent pulse through the lower winding.

Bus relay PDB represents a relay which is energized when a readout of the existing chain count is desired. No control circuits are here shown for relay PDB, but one example of such circuitry is disclosed in the aforementioned original application. It is to be noted, as shown in that reference application, that the circuit for relay PDB will include a back contact or relay PD to coordinate and separate counting and readout action. If a readout request is received by this station, circuits for relay PDP are interrupted at back contact *d* of relay PDB. It is to be noted that relay PD is provided with one stick circuit which includes its lower winding and front contact *a*, back contact *a* of a bus repeater relay PDBP, reverse contact *b* of relay PDP and the normally closed contacts *a*, in series, of pushbuttons 1PB, 10PB, and ϕPB. A special stick circuit is also provided for relay PD which holds this relay and thus retains a count while readout operation is occurring. This stick circuit includes the lower winding and front contact *a* of relay PD and front contact *a* of relay PDBP. This latter relay is energized by the simple circuit including front contact *d* of relay PDB which, as stated, is energized during readout operation. It is to be noted that relay PDBP, as indicated by the conventional downward pointing arrows drawn through contact armatures, is provided with slow release characteristics.

I shall now assume that, with the counting chains in their zero condition, that is, all relays released as shown in FIG. 1 and indicated at the vertical starting line at the left of FIG. 2, contact PDC closes to initiate a new count. It is suggested that, in addition to following the circuits hereinafter traced in FIG. 1, reference be made to the timing chart of FIG. 2 as an aid in understanding the operating of the counting chain. The closing of contact PDC energizes the upper winding of relay PD and this relay picks-up to close its front contacts. The closing of its front contact *a* completes the usual stick circuit for relay PD which assures that it remains picked up until relay PDP operates, regardless of the time contact PDC remains closed. The closing of front contact *b* of relay PD completes the circuit for energizing the upper winding of relay PDP, causing this relay to operate its contacts to close in the normal position. The circuit is now completed for energizing counting relay PD1 in the units section of the counting arrangement. This circuit is traced from terminal B over the normally closed contacts *a* of the three pushbuttons, normal contact *a* of relay PDP, back contacts *b* of relays Y and X, the winding of relay PD1, bus 24, back contact *e* of relay 10Y, back contact *f* of relay 10X, back contact *c* of relay PD10, bus 25, and back contact *b* of chain reset relay CRS to terminal N. Thus energized, relay PD1 picks-up to close its front contacts. It is to be here noted that during the counting of the first nine closures of contact PDC, no change occurs in any of the relays of the second or tens digit section of the counter arrangement. Therefore, bus 24 may be considered for this period as the equivalent of terminal N of the local source.

When contact PDC opens shortly thereafter, relay PD is deenergized and releases, its stick circuit being interrupted at reverse contact *b* of relay PDP. The closing of back contact *b* of relay PD energizes the lower winding of relay PDP which operates its contacts to close in the reverse position. Relay PD1 is held energized at this time by a stick circuit which includes its own front contact *a*, back contact *b* of relay PD2, and back contact *c* of relay Y. With the reverse contacts of relay PDP closed, the circuit is now complete for energizing relay X. This circuit includes the normally closed contacts *a* of pushbuttons, reverse contact *b* of relay PDP, front contact *b* of relay PD1, back contact *c* of relay PD2, and the upper winding of relay X. Relay X, thus energized, picks up to close its front contacts.

When contact PDC again closes to mark the second count, relays PD and PDP are energized in the fashion previously described. The closing of normal contact *a* of relay PDP now completes the circuit for energizing relay PD2, the circuit further including back contact *b* of relay Y, front contact *b* of relay X, back contact *b* of relay PD8, and the winding of relay PD2 to bus 24. Relay X is held energized at this time by a stick circuit including the normally closed contacts *a* of the pushbuttons, normal contact *b* of relay PDP, and front contact *a* and the lower winding of relay X. When relay PD2 picks up, it closes its front contact *b* in place of that back contact, thus interrupting the stick circuit for relay PD1, the circuit over front contact *c* of relay X being open at front contact *d* of relay Y. Relay PD1, thus deenergized, immediately releases. When contact PDC shortly opens, relay PD again releases and relay PDP operates its contacts to their reverse position. The energizing circuit for relay PD2 is now interrupted but this relay is held energized by a stick circuit including its own front contact *a* and back contacts *a* of relays PD4 and PD8. The stick circuit for relay X is interrupted at normal contact *b* of relay PDP, and since its energizing circuit is now opened at front contact *b* of relay PD1, relay X is deenergized and releases.

When contact PDC closes for the third count, relay PD1 is again energized, the circuit including normal contact *a* of relay PDP and back contacts *b* of relays Y and X. Relay PD2 is held energized over its previously traced stick circuit and this third count has no effect on this relay. Relays PD1 and PD2 are thus both energized and pick-up at this time to give, in binary form, the count of three. It may be noted that this count is the sum of the numerical suffixes of the reference characters of the relays which are energized. When contact PDC opens and relay PDP is operated to its reverse position, relay PD1 is held energized by a second stick circuit including its own front contact *a*, front contact *b* of relay PD2, back contact *c* of relay X, and back contact *b* of relay PD4. With the closing of reverse contacts of relay PDP, a circuit is completed for energizing relay Y including reverse contact *b* of relay PDP, front contact *b* of relay PD1, front contact *c* of relay PD2, and the upper winding of relay Y. Thus energized, relay Y picks-up, closing its front contacts.

When contact PDC next closes, the circuit is completed for enrgizing relay PD4. This circuit includes, in part normal contact *a* of relay PDP, front contact *b* of relay Y, and back contact *e* of relay X. Relay PD4, thus energized, picks-up and completes a stick circuit including its own front contact *a* and back contact *a* of relay PD8. The opening of back contact *a* of relay PD4, since back contact *d* of relay Y and front contact *d* of relay X are open, interrupts the stick circuit for relay PD2 which is thus deenergized and releases. The opening of back contact *b* of relay PD4 interrupts the existing stick circuit for relay PD1 and, with back contact *c* of relay Y open, the closing of front contact *b* of relay PD4 and, shortly, back contact *b* of relay PD2 can not complete any other stick circuit. Thus PD1 is deenergized and also releases. With normal contact *b* of relay PDP closed, relay Y is held energized by a stick circuit also including its own front contact *a* and lower winding. However, at the end of the count, when contact PDC again opens and relay PDP operates its contacts to the reverse position, the stick circuit for relay Y is interrupted at normal contact *b* of relay PDP. With the energizing circuit for the upper winding of relay Y interrupted at front contact *b* of relay PD1 as well as front contact *c* of relay PD2, relay Y is deenergized and releases at the end of count 4.

When the next count is entered by the subsequent closing of contact PDC, the circuit is again completed for energizing relay PD1. The circuit, previously traced, includes normal contact *a* of relay PDP and back contacts *b* of relays Y and X. The stick circuit for relay PD4 remains effective so that the condition in this section of the counting chain is now with relays PD1 and PD4 energized and picked up. This condition represents the binary equivalent of the decimal number 5, the translation being the sum of the numerical suffixes of the energized relays or 5. When the count ends, relay PR1 is held energized by its original stick circuit including its own front contact *a* and back contacts *b* and *c* of relays PD2 and Y, respectively. The closing or reverse contact *b* of relay PDP energizes the upper winding of relay X, the circuit further including front contact *b* of relay PD1 and front contact *c* of relay PD4 in multiple with back contact *c* of relay PD2.

The entry of the next count again causes the energization of relay PD2, the circuit including back contact *b* of relay PD8, front contact *b* of relay X and back contact *b* of relay Y. Relay X is held energized by the stick circuit including its own lower winding and front contact *a* and normal contact *b* of relay PDP. The stick circuit for relay PD1 is interrupted at back contact *b* of relay PD2 and the circuit over the corresponding front contact is interrupted at front contact *d* of relay Y so that relay PD1 is deenergized and releases. This section of the counting chain is now in a condition representing the binary equivalent of the numeral 6, i.e., the sum of suffixes 4 and 2. Relay X is held energized until contact PDC opens to cause the operation of relay PDP to its reverse position. This interrupts the stick circuit for relay X and, its energizing circuit also open, the relay is deenergized and releases. Relay PD2 is held energized at this time by a second stick circuit including its own front contact *a*, back contact *d* of relay Y, and back contact *a* of relay PD8.

The entry of the 7th count occurs with both relays X and Y released so that relay PD1 is again energized over the circuit previously traced. Relays PD4 and PD2 continue to be held energized over their stick circuits. At the end of the count, the closing of reverse contact *b* of relay PDP completes the circuits for energizing both relay X and relay Y. The circuits further include front contact *b* of relay PD1 and, for relay Y, front contact *c* of relay PD2, and, for relay X, front contact *c* of relay PD4. Relays Y and X, thus energized, pick up and the stick circuits for the counting relays are readjusted to hold them energized at this time. Actually, there is no change in the stick circuit for relay PD4. However, the stick circuit for relay PD2 now includes its own front contact *a*, front contact *d* of relay X, and back contact *a* of relay PD8. The shifted stick circuit for relay PD1 includes its own front contact *a*, front contact *b* of relay PD2, front contact *c* of relay X, front contact *d* of of relay Y, and back contact *a* of relay PD8. Since contacts *d* of both relay X and relay Y are of the continuity transfer type, the shift in the stick circuit for relay PD2 with the simultaneous energization of relays X and Y occurs without interruption the energization of the winding of relay PD2 so that this relay remains in its picked-up condition. The same condition holds true for relay PD1 whose initial stick circuit during count 7 includes back contacts *c* of relays X and Y and front contacts *b* of relays PD2 and PD4. As relays X and Y pick up, the continuity transfer contact arrangement assures the continued energization of relay PD1 so that it will not release under these conditions.

When contact PDC closes for the 8th count, the circuit is completed for energizing relay PD8, this circuit including normal contact *a* of relay PDP and front contacts *b* and *e*, respectively, of relays Y and X. Relay PD8 picks up, closing its own front contact *a* to complete a stick circuit through the relay winding to bus 24. The opening of back contact *a* of relay PD8 interrupts all of the existing stick circuits for relays PD1, PD2, and PD4. These relays, thus deenergized, immediately release. At the beginning of this count, relays Y and X are held energized by stick circuits completed at normal contact *b* of relay PDP. At the end of the count, however, when this normal contact is open, relays Y and X are deenergized since their energizing circuits are also interrupted at contacts of the counting relays, and stepping relays release at this time.

When the 9th count begins, the circuit previously traced is again complete for energizing relay PD1 which picks up, closing its own front contact *a* to complete the stick circuit further including back contacts *b* and *c* of relays PD2 and Y, respectively. The relays are thus now in the condition for the binary equivalent of the numeral 9, the translation being the sum of suffixes 8 and 1. At the end of this 9th count when relay PDP again operates to its reverse position, the previously traced circuit including reverse contact *b* of relay PDP and front contact *b* of relay PD1 is completed for energizing relay X through its upper winding. This relay picks up at this time.

When the 10th count occurs and relay PDP operates to its normal position, the circuit is completed for energizing the first relay in the next digit section of the counting arrangement, the relay PD10. This circuit may be traced over the normally closed contacts *a* of the manual pushbuttons, normal contact *a* of relay PDP, back contact *b* of relay Y, front contact *b* of relay X, front contact *b* of relay PD8, back contacts *b* of relays 10Y and 10X, the winding of relay PD10, bus 25, and back contact *b* of relay CRS to terminal N. It may be noted that the open back contact *b* of relay PD8 interrupts the energizing circuit for relay PD2 which thus is not energized at this time. The opening of back contact *c* of relay PD10 interrupts the connection from bus 24 to bus 25 and thus to terminal N, so that relays PD8 and PD1 are deenergized by this interruption of the existing stick circuits and these relays release.

At the end of this 10th count, the opening of normal contact *b* of relay PDP interrupts the stick circuit for relay X and since its energizing circuit is open at front contact *b* of relay PD1, relay X releases. At the same time, the closing of reverse contact *b* of relay PDP completes the circuit, further including front contact *b* of relay PD10, back contact *c* of relay PD20, and the upper winding of relay 10X, for energizing this latter relay, which picks up. Relay PD10 is held energized by its stick circuit which includes its own front contact *a* and winding, back contacts *b* and *c* of relays PD20 and 10Y, respectively, bus 25, and back contact *b* of relay CRS. It is apparent that this stick circuit remains effective as long as relay PD20 is not energized so that relay PD10 is held energized during the entry into the system of the next nine counts by contact PDC. Likewise, relay 10X is held energized alternately by its energizing circuit just traced and by its stick circuit which includes normal contact *b* of relay PDP and front contact *a* and the lower winding of relay 10X. These circuits are effective to hold relay 10X energized during the next ten counts, the operation of relay PDP between its normal and reverse positions being sufficiently fast to retain relay 10X in its picked up position. At the end of the 10th count, then, relay PD10 is energized, signifying the entry of a single count into the tens digit section of the decimal-binary counting arrangement, and all of the relays in the units digit section are released.

The next operation of contact PDC initiates a new cycle of operation in the unit section of the counting chain. As previously explained, relay PDP operates to its normal position and the circuit including normal contact *a* of that relay and back contacts *b* of relays Y and X is completed for energizing relay PD1. No circuit exists into the tens digit section of the counting arrangement so that no action occurs in this portion of the chain, the stick circuits holding relays PD10 and 10X energized. At the end of the count, relay PD1 is held energized by the stick circuit including its own front contact *a* and back contacts *b* and *c* of relays PD2 and Y, respectively. The connection from bus 24 to bus 25 and thus to terminal N at back contact *b* of relay CRS at this time includes back contact *e* of relay 10Y, front contact *f* of relay 10X, and front contact *c* of relay PD10. This circuit path remains in effect throughout the next nine counts entered into the unit section of the counting arrangement. Referring to the timing chart of FIG. 2, it may be seen, by extending the action illustrated for the units section relays to the relays for the tens section, that when relay PD10 releases at the end of the second 10 counts, relay 10X will also release. This action is similar to that shown for relays PD1 and X at the end of the second count. The path between bus 24 and bus 25 will then be reconstituted over the back contacts as originally traced. At other times, however, the circuit path between bus 24 and bus 25 will include front contact *e* of relay 10Y and front contact *c* of relay PD10.

The condition now existing in the arrangement provides a count of 1 in the tens digit position with relay PD10 energized and a count of 1 in the units digit position with relay PD1 energized. Thus a count of 11 is signified by the condition of the counting arrangement. When the next count occurs and relay PDP closes its normal contact *a*, a circuit is completed for energizing relay PD2, further including back contact *b* of relay Y, front contact *b* of relay X, now closed, and back contact *b* of relay PD8. At the end of this count, relay X is deenergized and releases, relay PD2 holding energized over the stick circuit including its own front contact *a* and back contacts *a* of relays PD4 and PD8. The stick circuit for relay PD1 is interrupted at back contact *b* of relay PD2 and this relay releases during this 12th count. The cycle of operation through the units digit section of the counting arrangement continues, each count representing 10 plus the unit digit count. It is believed unnecessary to continue further in this description since the action of the units digit portion is identical with that described during the first 10 counts.

If a decimal count of 99 is exceeded by the two section counting arrangement illustrated, the system of my invention provides for resetting the chain to its zero condition so that the counting action may be repeated. Referring in FIG. 2 to the detailed time chart of the unit section operation and extending the action to the tens section, it is apparent that, upon completion of count 99, relays PD1, PD8, and X in the units digit section and relays PD10, PD80, and 10X in the tens digit section are energized. Upon the operation of relay PDP to its normal position with the entry of the next count by contact PDC, relays X and 10X are retained energized by their previously traced stick circuits. A circuit is also completed for energizing relay CRS, including normal contact *a* of relay PDP, back contact *b* of relay Y, front contacts *b* of relays X and PD8, back contact *b* of relay 10Y, front contacts *b* of relays 10X and PD80, and the winding of relay CRS. This relay picks up, completing a stick circuit including its own front contact *a* and normal contact *b* of relay PDP. The opening of back contact *b* of relay CRS interrupts the connection from bus 25 to terminal N, and thus interrupts the stick circuits of all energized counting relays. These relays release to indicate a zero count (here the equivalent of 100). When contact PDC opens and relay PDP returns to its reverse position, relays X, 10X, and CRS are deenergized by the opening of their stick circuits and release.

Relay CRS may also be energized to reset the counting relays by an external reset control when, for any reason, it is desired to restore the chain count to zero. Such control is here represented by the pushbutton $\phi$PB. When this device is actuated, the closing of its contact *b* energizes relay CRS. The closing of the normally open contact *a* of device $\phi$PB provides stick circuit energy for relay CRS and such stepping relays as are energized in lieu of the usual stick circuit energy over the normally closed contact *a* of this device. A final circuit for relay CRS includes back contact *d* of relay PDB and front contact *b* of relay PDBP. When a readout request control is received, as indicated by relay PDB being energized, a chain reset is also included. However, the actual reset action, i.e., relay CRS energized, is delayed until the count readout is accomplished by relay PDB. Completion of this reset action as assured by front contact *b* of relay PDBP remaining closed until back contact *d* of relay PDB recloses.

It is obvious therefore that the counting arrangement above described provides a binary count for each digit of the decimal number represented by the total operations of the counter contact. The result is a decimal binary code represented by the energized relays in each digit portion of the number. The weight of the energized relays, taken from the numerical suffix of the reference character, can be added to obtain the resultant value of the count, each digit being read in the usual order. The decimal binary code allows an accurate and simple transmission of the count data to a control office over a coded remote control system. Each binary number position is a separate code step in the indication code. The binary 1 or 0, that is, the corresponding counting relay picked up or released, is characterized by the two opposite characters, respectively, of each code step. Although specific circuits for count readout are not shown herein, it is obvious that simple circuits using front contacts of the counting relays and completed by the readout bus relay PDB will serve such purposes. Specific illustrations of the use of the counting chain relays are illustrated in the previously mentioned original application.

Although I have herein shown and described but one form of decimal binary code counting apparatus embodying my invention, it is to be understood that various changes and modifications may be made therein within the scope of the appended claims without departing from the spirit and scope of my invention.

Having thus described my invention, what I claim is:

1. Counting apparatus, comprising in combination,
(a) a source of pulses representing the number to be counted,
(b) a counting means divided into a plurality of counting sections one for each decimal digit of the number count,
(c) a stepping means for each counting section,
(d) a circuit network connecting said source to the lowest order counting section and controlled by the associated stepping means for recording in that counting section the count of said pulses in binary form,
(e) a circuit network for each other counting section controlled by the associated stepping means and with connections to said source controlled by the next lower order counting section for recording in binary form each tenth pulse supplied to said next lower order counting section,
(f) circuit means controlled by said source and by the associated counting section for driving each stepping means in a predetermined pattern assuring the recording of said pulses in binary code form,
(g) a reset means for each counting section controlled by the next higher order section and its associated stepping means for resetting the counting section when a tenth pulse is supplied to that next higher order section.

2. Counting apparatus, comprising in combination,
(a) a plurality of counting relay banks, one for each decimal digit in the total number count to be recorded,
(b) a stepping means for each counting relay bank,
(c) a source of successive pulses representing the number to be recorded,
(d) a circuit network connecting said source to the lowest order relay bank and controlled by the associated stepping means for driving that relay bank to record the pulses in binary form,
(e) a circuit means for each other counting relay bank controlled by the adjacent lower order relay bank for supplying each tenth pulse received by that next lower order bank to said other bank,
(1) said circuit means for each other bank being further controlled by the associated stepping means for recording such tenth pulses in binary form,
(f) an operating circuit means for each stepping means connected to said source and controlled by the associated relay bank for driving the stepping means through a preselected binary operating pattern in step with said successive pulses,
(g) a reset means for each relay bank controlled by the next higher order bank for resetting said each bank to a zero condition when a pulse is supplied to that next higher order relay bank.

3. Counting apparatus, comprising in combination,
(a) a source of successive pulses representing the number to be counted,
(b) a counting relay chain divided into a plurality of sections, one for each decimal digit of the number count,
(c) stepping relays associated with each of said counting sections,
(d) a counting circuit means for each section controlled by the associated stepping relays for recording input pulses to that section in binary code form,
(e) circuit connections from said source to the counting circuit means for the lowest order counting section for supplying said successive pulses thereto,
(f) other circuit connections from said source to the counting circuit means for each other counting chain section,
(1) each said other circuit connection controlled by the next lower order counting section for supplying to the associated other section only every tenth input pulse received by said next lower ordered section,
(g) an operating circuit means for each set of stepping relays connected to said source and controlled by the associated counting section of driving that set of stepping relays through a preselected binary pattern of operation in step with the input pulses supplied to that section,
(h) a reset means for each counting section controlled by the next higher order section for resetting said each section to a zero count when an input pulse is supplied to that next higher order section.

4. Counting apparatus, comprising in combination, (a) a plurality of counting sections, one for each decimal digit in the total count to be recorded, (1) each section including a set of counting relays and a set of stepping relays, (b) a source of successive pulses representing the count to be recorded, (c) a counting circuit means controlled by said source and by the stepping relays of the lowest order section for driving the counting relays of that section to record said successive pulses in binary code form, (d) another counting circuit means for each counting section other than said lowest order section, (1) each other counting circuit means being controlled by said source and by each lower order section for supplying to the associated other section each tenth pulse received by the next lower order section, (2) each other counting circuit means further controlled by the associated stepping relays for driving the counting relays of that other section to record such tenth pulses in binary code form, (e) driving circuit means for the stepping relays of each section controlled by said source and by the associated counting relays for detecting the successive pairs of odd and even numbered pulses supplied to the corresponding section to condition the associated counting circuit means to record the input pulses in binary code form, (f) a reset means for each counting section controlled by the next adjacent higher order section for resetting the associated section to a zero count condition when a tenth pulse is supplied to that next higher order section.

5. Counting apparatus, comprising in combination, (a) a plurality of banks of four counting relays, one bank for each decimal digit in the total number count to be recorded, (b) a pair of stepping relays associated with each counting relay bank, (c) a source of successive pulses representing the number to be recorded, (d) a circuit network connecting said source to the lowest order relay bank and controlled by the associated stepping relays for driving that relay bank to record the pulses in binary code form, (e) a circuit means for each other counting relay bank controlled by the adjacent lower order relay bank for supplying each tenth pulse received by that adjacent lower order bank to said other bank, (1) the circuit means for each other bank being further controlled by the associated stepping relays for recording such tenth pulses in binary code form, (f) an operating circuit means for each pair of stepping relays connected to said source and controlled by the associated counting relays for driving these stepping relays through a preselected binary pattern to follow only the successive pulses supplied to that associated relay bank, (g) a reset means for each relay bank controlled by the next higher order bank for resetting said counting relays to a zero condition when a pulse is supplied to that next higher order relay bank.

6. A digital counting chain comprising, (a) a section of chain for each decimal digit of the count being recorded, (1) each section comprising four counting relays connected in counting arrangement and two stepping relays connected for detecting the termination of counts in that section, (b) a source of driving pulses representing the count to be recorded, (c) a control circuit network for the counting relays of each section including contacts of the corresponding stepping relays for delivering pulses supplied thereto to advance the relay counting action in binary form, (1) the network of the first section being normally connected to said source for receiving pulses therefrom, (d) another control circuit for each section including stepping and counting relay contacts closed when the tenth pulse is supplied to that section for bypassing that pulse to the network for the next higher digit section, (e) a reset circuit controlled by each section except the lowest digit section and responding to each count supplied thereto for resetting the counting relays in the preceding section.

7. A digit section of a decimal binary counting chain comprising, (a) four counting relays, (b) two stepping relays, (c) a source of input pulses to be counted, (d) a first circuit network connected to said stepping relays and controlled by said source and by said counting relays for driving said stepping relays through a preselected binary operating pattern as the count advances, (e) a control circuit network for said counting relays connected to said source and controlled by contacts of said stepping relays for delivering pulses to drive said counting relays in a binary counting action, (f) a bypass circuit including contacts of said stepping relays and a contact of the highest order counting relay for passing each tenth input pulse from said source to an adjacent higher order digit section of said chain, (g) a reset means controlled by said adjacent section only when said bypass circuit is effective for resetting said counting and stepping relays of said section to a zero count condition.

8. A digit section of a counting chain comprising, (a) four counting relays connected in binary counting arrangement, (b) two stepping relays connected for detecting the termination of counts, (c) a source of driving pulses, (d) a control circuit network for said counting relays including contacts of said stepping relays, (1) said network being connected to said source to delivery pulses for advancing the chain counting action in binary form, (e) another control circuit including contacts of said stepping relays and said counting relays closed during each tenth pulses for bypassing that pulse into an adjacent chain section, (f) a reset means controlled by said adjacent chain section for responding to each tenth pulse and having connections to reset all relays in said digit section.

9. A digit section of a decimal binary counting chain comprising, (a) four counting relays, (b) two stepping relays, (c) a source of input pulses to be counted, (d) a first circuit network connected to said stepping relays and controlled by said source and by said counting relays, (1) said network being effective for energizing one or both of said stepping relays to detect the termination of each odd count pulse, (2) said network being effective for deenergizing the actuated stepping relays to detect the termination of each even count pulse, (e) a control circuit network for said counting relays connected to said source and controlled by contacts of said stepping relays for delivering pulses to drive said counting relays in a binary counting action, (f) a bypass circuit including contacts of said stepping relays and a contact of the highest order counting relay for passing each tenth input pulse from said source to an adjacent higher order digit section of said chain, (g) a reset means controlled by said adjacent section only when said bypass circuit is effective for resetting said counting and stepping relays of said section to a zero count condition.

References Cited by the Examiner

UNITED STATES PATENTS

| | | | |
|---|---|---|---|
| 2,375,413 | 5/1945 | Guenther | 317—140 |
| 2,767,910 | 10/1956 | Vande Sande | 235—61 |
| 2,883,588 | 4/1959 | Leonard | 317—140 |
| 2,954,511 | 9/1960 | Jackel | 317—140 |

SAMUEL BERNSTEIN, *Primary Examiner.*